US007692530B2

(12) United States Patent
Turner et al.

(10) Patent No.: US 7,692,530 B2
(45) Date of Patent: Apr. 6, 2010

(54) IDENTIFICATION AND TRACKING OF INFORMATION STORED ON RADIO FREQUENCY IDENTIFICATION DEVICES

(76) Inventors: Richard H. Turner, 7650 80$^{th}$ Pl. SE., Mercer Island, WA (US) 98040; Harvey L. Kasdan, 5414 Sunnyslope Ave., Sherman Oaks, CA (US) 91401

( * ) Notice: Subject to any disclaimer, the term of this patent is extended or adjusted under 35 U.S.C. 154(b) by 1071 days.

(21) Appl. No.: 11/366,050

(22) Filed: Mar. 1, 2006

(65) Prior Publication Data

US 2006/0220787 A1 Oct. 5, 2006

(51) Int. Cl.
*H04B 1/38* (2006.01)

(52) U.S. Cl. .................... 340/5.61; 340/5.64; 340/5.65; 340/572.4; 340/3.1; 340/825.72

(58) Field of Classification Search ................ 340/5.73, 340/5.1, 5.2, 5.64, 5.65, 572.4, 3.1; 235/385, 235/381, 384; 46/47
See application file for complete search history.

(56) References Cited

U.S. PATENT DOCUMENTS

| | | | | |
|---|---|---|---|---|
| 5,150,099 | A | 9/1992 | Lienau | 340/552 |
| 5,448,501 | A | 9/1995 | Hablov et al. | 364/517 |
| 5,603,080 | A | 2/1997 | Kallander et al. | |
| 5,774,875 | A * | 6/1998 | Medeiros et al. | 705/28 |
| 5,786,760 | A | 7/1998 | Suzuki et al. | 340/541 |
| 5,886,634 | A | 3/1999 | Muhme | |
| 5,952,922 | A | 9/1999 | Shober | |
| 6,041,410 | A | 3/2000 | Hsu et al. | 713/186 |
| 6,150,921 | A | 11/2000 | Werb et al. | |
| 6,294,997 | B1 | 9/2001 | Paratore et al. | |
| 6,424,264 | B1 | 7/2002 | Giraldin et al. | |
| 6,563,425 | B2 | 5/2003 | Nicholson et al. | |
| 6,614,392 | B2 | 9/2003 | Howard | |
| 6,816,075 | B2 * | 11/2004 | Grunes et al. | 340/572.1 |
| 6,819,219 | B1 | 11/2004 | Bolle et al. | |
| 6,829,520 | B1 | 12/2004 | Green | |
| 6,946,989 | B2 | 9/2005 | Vavik | |
| 2002/0008625 | A1 | 1/2002 | Adams et al. | |
| 2002/0027504 | A1 | 3/2002 | Davis et al. | |
| 2002/0167417 | A1 | 11/2002 | Welles, II et al. | |

(Continued)

FOREIGN PATENT DOCUMENTS

CA 2 299 053 A1 4/2001

(Continued)

OTHER PUBLICATIONS

How RFID Works; Scientific American, p. 59, Jan. 2004.

(Continued)

*Primary Examiner*—Vernal U Brown

(57) ABSTRACT

A method and apparatus for detecting and tracking an object within a defined area, and determining its position, status, movement and identity therein, includes interrogating the defined area to communicate with an information device associated with an object and transmit information received to a master controller unit, which determines the object's presence, position, status, movement and identity within the defined area. It is emphasized that this abstract is provided to comply with the rules requiring an abstract which will allow a searcher or other reader to quickly ascertain the subject matter of the technical disclosure. It is submitted with the understanding that it will not be used to interpret or limit the scope or the meaning of the claims.

15 Claims, 3 Drawing Sheets

U.S. PATENT DOCUMENTS

| | | | |
|---|---|---|---|
| 2003/0058110 A1 | 3/2003 | Rich | |
| 2003/0107515 A1 | 6/2003 | Howard | |
| 2003/0117268 A1 | 6/2003 | Hewitt et al. | |
| 2004/0002894 A1 | 1/2004 | Kocher | |
| 2006/0180659 A1 * | 8/2006 | Loffredo et al. | 235/380 |

FOREIGN PATENT DOCUMENTS

| | | | |
|---|---|---|---|
| DE | 196 08 348 | A1 | 11/1997 |
| EP | 0 357 309 | A2 | 3/1990 |
| EP | 0357309 | A2 | 3/1990 |
| EP | 0 924 655 | A | 6/1999 |
| EP | 1 244 081 | A1 | 3/2002 |
| EP | 1244081 | A1 | 9/2002 |
| GB | 2 265 038 | A | 8/1993 |
| JP | 10 282220 | A | 1/1999 |
| JP | 2002207705 | A | 7/2002 |
| WO | WO 01/26327 | A2 | 12/2001 |

OTHER PUBLICATIONS

Das, Raghu; An introduction to RFID and Tagging Technologies, IDTechEx Limited, 2003.

Staedter, Tracy; Iris Identification; Technology Review, p. 73, Mar. 2003.

Shen, Michelle; The “People ” Element In Biometrics And Physical Access Control, ePolymath.com, Apr. 14, 2003.

Graevenitz, Gerik; Biometrics in Access Control Biometrics in Access Control; A&S International, vol. 50, pp. 102-104, Taipei, 2003.

Staedter, Tracy, The Smart Antenna, Technology Review, Feb. 2003 p. 81.

Schrage, Michael, Little Bang for the RFID Buck, Technology Review, Nov. 2003.

Jenn, David C., 8-element Phased Array Directional Patterns; Professor, Naval Postgraduate School, PhD, University of Southern California.

Boutin, Paul; Wi-Fi That Follows You Around, Wired News, S.F., Nov. 4, 2002.

Guan, Xiang et al.; A 24GHz CMOS Front-end; Department of Electrical Engineering, Calif. Inst. of Tech.

Picton, Roger; Synthetic Aperture Radar (SAR); Journal of Battlefield Technology, vol. 3, No. 1, Mar. 2000.

Cameron, David; A new biometric technology may soon lead to safer handguns; Skin Chips; Aug. 8, 2002.

Lumidigm LumiGuard™ Sensor; The Science Behind LumiGuard™.

General Motors OnStar®.

U.are.U Firefly OEM.

Two-dimensional Array Antenna Patterns.

Vascular VP-II.

* cited by examiner

FIG. 1
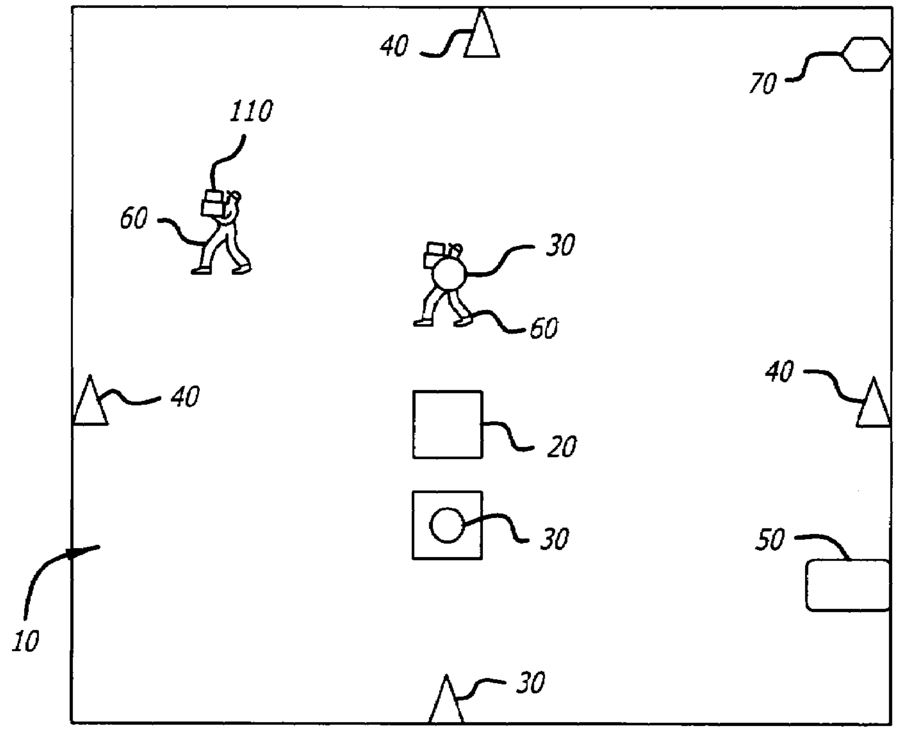
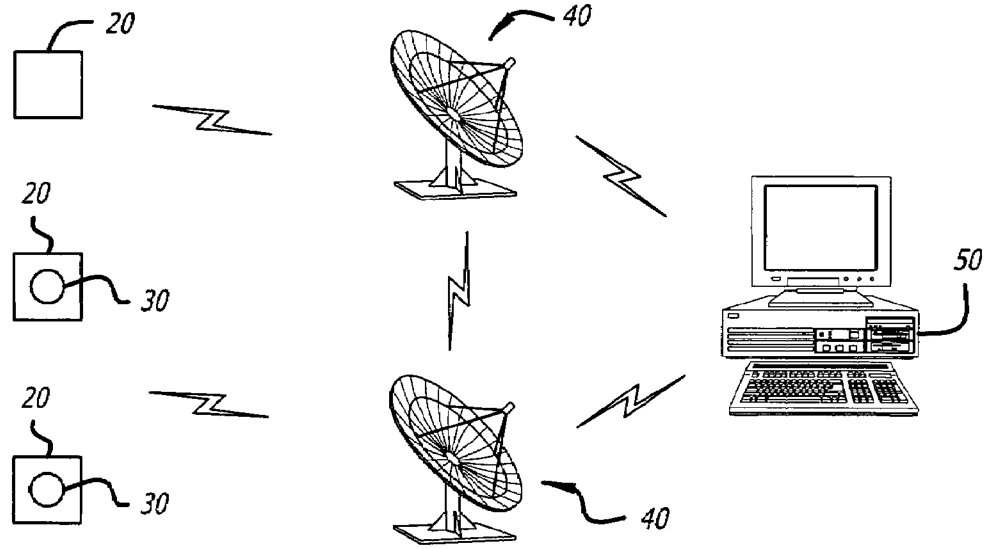
FIG. 2

FIG. 4
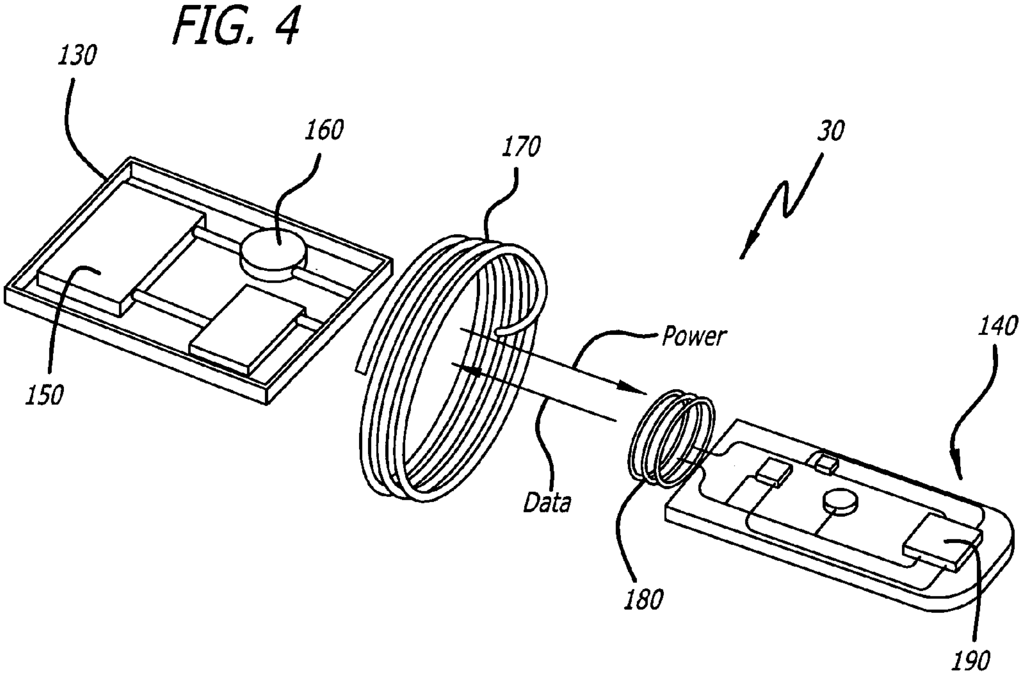
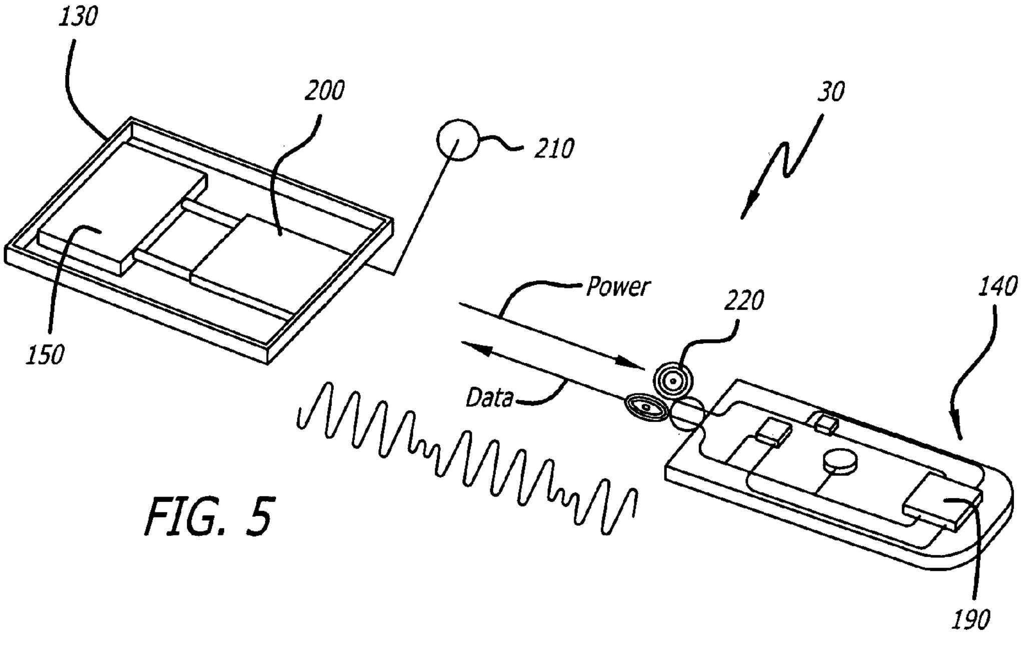
FIG. 5

IDENTIFICATION AND TRACKING OF INFORMATION STORED ON RADIO FREQUENCY IDENTIFICATION DEVICES

CROSS-REFERENCE TO RELATED APPLICATIONS

This application claims priority to the non-provisional patent application having Ser. No. 11/040,137 filed on Jan. 21, 2005, which is hereby incorporated by reference in its entirety as if fully set forth herein.

FIELD OF THE INVENTION

The present invention generally relates to the detection of objects. Specifically, the present invention relates to systems and methods that track and detect position, status, movement and identity of objects within a defined area.

BACKGROUND OF THE INVENTION

Systems that identify and track objects within a particular area include security systems used to identify unauthorized access to restricted areas and set off alarms when someone enters an unauthorized area. Conventional security systems control entry access to an enclosed structure. Typically, the enclosed structures have secured doors and windows that prevent anyone without a key from entering the building. Many commercially available systems require anyone entering an enclosure to confirm their access authorization by first entering a code at a keypad at the entrance to the enclosure, or swipe a card or similar device past an access reader near the entry point. The security confirms the identity of the person based on the access code or encoded information on the card and unlocks the door for entry.

These systems require access authorization at each point of entry. In addition, these systems do not have an economic way of monitoring people as they move within or leave an enclosure. As a result, it is possible for people to remain in a building intentionally or accidentally without detection. In emergency situations it can be critical to know if everyone has been evacuated to know when to initiate search and rescue procedures. Also, individuals may need to enter a building late at night or on holidays to complete a work assignment. If they become ill or injured, this problem goes undetected since systems such as those described in the above examples cannot detect when someone leaves a building or if they remain in the building.

Additionally, if someone is in an enclosure, the only methods to control access from one area of an enclosure to another area are to install doors with access authorization hardware, to install video security cameras to monitor movement, or to employ security guards at checkpoints to control access. Any of these solutions is complex and costly.

Access control systems also limit flexibility to readily change the configuration of the work space or use a common space for workers with different levels of authorization. For example, manufacturers who have several contract manufacturers may use the same space for manufacturing different processes. Since the contract groups operating in this space are employees of different companies, it is desirable for these workers to have access only to the floor space reserved for their activities. It is also, desirable not to build enclosures and install security systems to control access since the manufacturing needs of the company and the space required for these changes may change quickly over time depending on business opportunities or economic conditions.

Other conventional tracking systems include package tracking and warehousing. Tracking of packages includes affixing bar codes to letters and packages and scanning the labels at pickup and delivery points. The identity of the letter or package retrieved from the barcode label might be combined with positional information based on global positioning or more simply based on a known route or reported location of the delivery person. In each case a delivery person must scan the barcode attached to the letter or package. Also, the spatial location, presence or identity of the package within a delivery vehicle or warehouse is not known continuously in real time because bar code readers used to establish identity and location required close proximity of the bar code reader to the bar code.

In warehousing, which involves assigning items numbers to inventory, if someone fails to place an item in the correct location in the warehouse the item may be lost. Warehousing does not provide security features to insure that items really enter and leave the warehouse when management thinks they are entering or leaving the warehouse, and efficient use of the warehouse depends on accurate prediction of the space requirement for an inventory supply and requires reorganizing the warehouse space in case inventory levels of particular items change in response to business conditions.

SUMMARY OF THE INVENTION

The present invention provides a method of locating an object within a defined area, comprising interrogating the defined area to determine the presence of an object within the defined area, wherein the at least one interrogation device is within communication range of at least one master controller unit and transmits a signal within the defined area and receives data relating to the object if the object is within the defined area, transmitting the data from the at least one interrogation device to the at least one master controller unit and storing the data received in a memory therein, compiling the data received from the at least one interrogation device at the at least one master controller unit, and interpreting the data compiled by at the least one master controller unit to determine characteristic information of the object within the defined area.

In another embodiment, the present invention provides an object detection apparatus comprising a low frequency information device positioned on an object within a defined area, at least one high frequency interrogation device, the at least one interrogation device within a transmission and detection range of the defined area, a passive repeater powered by the at least one interrogation device, the passive repeater receiving a high frequency signal transmitted by the least one interrogation device and converting to a low frequency signal for communication with the information device to determine the presence of an object, and receiving a low frequency signal from the information device and converting to a high frequency signal for transmission to the at least one interrogation device, and a master controller unit within a transmission and detection range of the at least one interrogation device and capable of receiving information transmitted from the at least one interrogation device, wherein the passive repeater provides an interface to communicate information over a distance.

The foregoing and other aspects of the present invention will be apparent from the following detailed description of the embodiments, which makes reference to the several figures of the drawings as listed below.

BRIEF DESCRIPTION OF THE DRAWINGS

FIG. 1 shows an object tracking system and method within a defined area according to one embodiment of the present invention;

FIG. 2 shows components of an object tracking system and method according to one embodiment of the present invention;

FIG. 4 is a three dimensional view of one type of information device for use with the present invention; and FIG. 5 is a three dimensional view of another type of information device for use with the present invention.

DETAILED DESCRIPTION OF THE EMBODIMENTS

Figure 3:
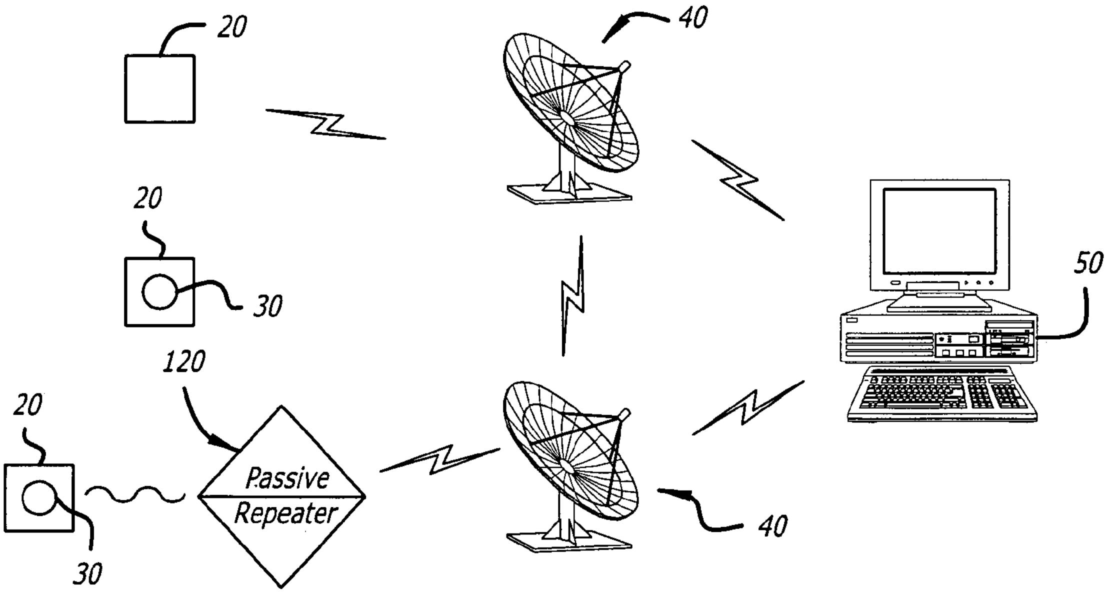
FIG. 3 is another view of components of an object tracking system and method according to one embodiment of the present invention.

In the following description of the present invention reference is made to the accompanying drawings which form a part thereof, and in which is shown, by way of illustration, exemplary embodiments illustrating the principles of the present invention and how it may be practiced. It is to be understood that other embodiments may be utilized to practice the present invention and structural and functional changes may be made thereto without departing from the scope of the present invention.

The present invention is embodied in a system comprising one or more of the elements shown in FIG. 1 and described in the following specification.

FIG. 1 represents a system and associated methods to detect position, status, movement and identity of objects entering, leaving and residing within defined spaces, areas, or volumes. FIG. 1 shows a defined area 10, within which there are objects 20 which are capable of entering, exiting, and residing within the defined area 10. FIG. 1 shows that the objects 20 may or may not include an information device 30 positioned thereon. Interrogation devices 40 are shown in FIG. 1 placed within the defined area 10; however, it is to be understood that any number of interrogation devices 40 may be placed within the defined area 10, outside the defined area 10, or both. Also, FIG. 1 shows master controller units 50 placed within the defined area 10. However, as with the interrogation devices 40, any number of master controller units 50 may be placed within the defined area 10, outside the defined area 10, or both.

The objects 20 may be animate (for example, people) or inanimate (for example, packages). The system and methods may employ one or more information devices 30, one or more interrogation devices 40, and one or more master controller units 50. The information devices 30 are either passive or active. An information device 30 may be any type of device which is capable of identifying or providing characteristic information for an object 20 on which it resides, including, for example, Radio Frequency Identification (RFID) tags. Inanimate objects 20 may include sensors or controllers that the system may query for additional information or control. One or more interrogation devices 40 are positioned within a transmission and detection range of the defined area 10 (an the information devices 20 located therein) and within a transmission and detection range of another interrogation device 40, if more than one interrogation device 40 is utilized. The interrogation devices 40 receive signals reflected from objects 20 or information devices 30, or signals generated by information devices 30 up to 100 meters in a narrow aperture. The signals received contain directional field strength information as well as information about the identity of the object 20.

The present invention also contemplates that one or more master controller units 50 are placed within a transmission and detection range of one or more of the interrogation devices 40. The interrogation devices 40 may interrogate an information device 30 or object 20 simultaneously and communicate with each other and with the master controller unit 50 as a network. The master controller units 50 receive information from one or more interrogation devices 40, and compile this information for human review or automatic response to the information. The master controller unit 50 can interpret directional field strength information from two or more interrogation devices 40 to define spatial coordinates over time of information devices 30 or objects 20. The master controller unit 50 combines this spatial coordinate information with the identity information retrieved by interrogation devices 40 to locate objects 20. Using this coordinate information it is possible to track objects 20 of known identity within a defined area 10 that is not necessarily confined by walls.

The defined area 10 may be an area, volume or space of any size and may be single or multi-dimensional. The perimeter of the defined area 10 need not necessarily be the enclosure of a room or building. The area or volume of the defined area 10 is only limited by the transmission and reception range of the interrogation devices 40 placed near, around or within the defined area 10. The defined area 10 can have any number of objects 20 with or without information devices 30 therein. The objects 20 may be animate or inanimate, and the animate objects 20 may include people 60. The defined area 10 can also have inanimate objects 20 such as packages 110 with or without information devices 30. The defined area 10 has one or more interrogation devices 40 each one of which is placed close enough to its nearest neighboring interrogation device 40 so that it can communicate with it. All interrogation devices 40 are able to communicate with one another and with the master controller units 50 directly or through other interrogation devices 40.

An interrogation device 40 interrogates the defined area 10 to obtain characteristic information associated with an object 20. In one embodiment, interrogation of the defined area 10 includes communication with an information device 30. Communication with the information device 30 provides a signal which represents data having characteristic information about the object 20. The data is compiled by the master controller unit 50 to determine the characteristic information, which may include at least one of identity, presence, status, and position of the object 20 within the defined area 10.

The information device 30 may store characteristic information that identifies the animate and inanimate objects 20 associated with the information device 30. For both animate and inanimate objects 20, the information device 30 may have preprogrammed authorization levels or may receive authorization levels dynamically from the master controller units 50 via the interrogation device 40.

For animate objects 20, the information device 30 may contain additional information specific for the animate object 20, including but not limited to (i) biometric information, (ii) physiological information for animate objects, and/or (iii) legal, financial or health information. For animate objects 20 without an information device 30, identity may be determined using biometric information independent of the information device 30 and is obtained by scanning the person 60.

For inanimate objects 20, the information device 30 may contain information in addition to the identity and authorization level of the inanimate objects 20, including but not limited to (i) chemical and physical properties of the inanimate object, (ii) preferred storage conditions and shelf life, (iii) date of manufacture, (iv) shipping information, (v) safety and handling information. For inanimate objects 20 without an information device 30, the interrogation device 40 may scan the object 20 to determine its position, change in position, radio frequency signature and other information that may assist in identifying the object 20.

The interrogation device 40 interrogates an object 20 by transmitting a signal into the defined area 10. In one embodiment, the interrogation device 40 sends radio frequency transmissions to a person 60 or package 110 having an information device 30 position thereon. The interrogation device 40 then detects a signal sent back from the information device 30. The returned signal contains information stored in the information device 30. The interrogation device 40 may be a fixed device or a wireless or mobile device, such as a handheld device.

The master controller unit 50 receives, compiles, and decodes information from one or more interrogation devices 40. The master controller unit 50 can also transmit information to other master controller units 50. The master controller unit 50 determines the identity of the object 20 by comparing the information obtained from the information device 30 and comparing it to reference data associated with the object 20 previously stored in the master controller unit 50 or accessed by the master controller unit 50 from another storage medium.

The master controller unit 50 determines the spatial coordinates of the object 20 by comparing the angle of maximum field strength during transmission and reception and the time required for transmission from one or more interrogation devices 40. The master controller unit 50 may also determine motion by comparing spatial coordinates determined over time. In another embodiment, the master controller unit 50 determines motion by analyzing Doppler shift, in which waves propagated by an object are analyzed for frequency changes to determine if the object is in motion over a given period of time. The master controller unit 50 is capable of determining if a person 60 or object 20 is authorized to be within a defined area 10 by comparing authorization information with pre-approved authorization information for the defined area 10 stored in a memory in the master controller unit 50 and determining based on spatial coordinates of the object 20 if it is within the defined area 10. The master controller unit 50 can then create and transmit an alarm 70 to any one of several alarming devices 80 (not shown). Examples of alarming devices 80 might be (1) a CRT display of the alarm status for human review, (2) wireless transmission to an audible (for example, a siren or horn) or visual (for example flashing lights) alarm visible to people within or external to the defined area or (3) to an alarming device 80 on the information device 30 itself. The master controller unit 50 can also transmit preprogrammed responses to other devices.

FIG. 2 shows components of an object tracking system and method according to one embodiment of the present invention. In this embodiment, the master controller unit 50 is a computer or other similar device in a network that communicates with wireless interrogation devices 40. The interrogation devices 40 are within a transmission and detection range of the master controller unit 50 and are within a transmission and detection range of objects 20 that reside within a defined area 10 with or without information devices 30. Additionally, the information devices 30 may be active or passive. Active information devices 30 are powered and capable of transmission to and from an interrogation device 40. Passive information devices 30 are not powered, but instead may derive power from the signal transmitted by the interrogation device 40 itself, or may be reflective devices, or both.

FIG. 3 is another view of components of an object tracking system and method according to one embodiment of the present invention. FIG. 3 shows the master controller unit 50 is a computer or other similar device in a network that communicates with wireless interrogation devices 40. The interrogation devices 40 are within a transmission and detection range of the master controller unit 50 and are within a transmission and detection range of objects 20 that reside within a defined area 10 with or without information devices 30. In FIG. 3, the interrogation device 40 communicates with the information devices 30 via a passive repeater 120. In this embodiment, the interrogation devices 40 communicate using microwave frequencies with small antennas. The passive repeater 120 allows microwave communication with low frequency information devices 30 placed on objects 20 by relaying the signals back and forth between the interrogation device 40 and the information device 30. The passive repeater 120 also allows communication by inductive coupling. This embodiment also allows for the use of either of active or passive information devices 30 as described herein.

FIG. 1, FIG. 2 and FIG. 3 generally describe systems and methods which may be used in many different embodiments of the present invention.

One such embodiment provides a system and method that permits tracking objects 20 entering, exiting, residing within, and moving within defined areas 10. One aspect of this embodiment is monitoring objects 20 entering and leaving a defined area 10. Security systems in use today often only provide an automatic method of monitoring entry into an area; exiting a space is either not automatic or is not monitored at all. The present invention provides a means of monitoring not only entry but also exit from a defined area 10 since it is possible to determine if an animate or inanimate object 20 has moved outside of defined coordinates. This capability is helpful to determine if animate or inanimate objects 20 remain within a secured area once they have entered.

Another embodiment of the present invention involves automatic real-time surveillance of an object 20 within a defined area 10. Defined areas 10 may be buildings or areas in which a high level of security is needed. In this embodiment, automatic real-time surveillance is conducted by interrogating objects 20 continuously or periodically in real time to determine identity, spatial coordinates, change in spatial coordinates and change in status. In one aspect of this embodiment, interrogating is performed by communicating with an information device 30 positioned on the object 20. In another embodiment, interrogation of the object 20 includes performing a biometric scan of the object 20.

In a further embodiment, objects 20 in an ensemble configuration are monitored to determine if the objects 20 stay together or are separated. For example a guard and a group of prisoners may be monitored to determine if they all stay together within a defined area 10. If the guard or one of the prisoners is missing an alarm 70 is created.

Another embodiment of the present invention is a system and method of controlling and confirming evacuation from a defined area 10. When a defined area 10 is evacuated during an emergency it is important to determine if every person 60 or object 20 has left the defined area 10. If the defined area 10 remains intact following an emergency, interrogation devices 40 installed in the defined area 10 can determine if objects 20 with or without information devices 30 still remain in the defined area 10. One can also use a handheld interrogation device 40 to determine if any people 60 or objects 20 remain in the defined area 10 in the event that the interrogation devices 40 that normally service the defined area 10 have been destroyed during the emergency. In another aspect of this embodiment, an interrogation device 40 can also be used to quickly count all the people 60 evacuated and held in a defined area 10 following evacuation.

Yet another embodiment of the present invention provides a system and method for authorization level control for a defined area 10. The authorization level for a person 60 or object 20 depicted in FIG. 1 may be preprogrammed in an information device 30 carried by a person 60 or object 20. It may be dynamically assigned by determining the identity of the object 20 by interrogating the information device 30 positioned on the object 20 (or some other means of identifying the object 20 as described herein). The object identity is compared to authorization levels stored in the master controller unit 50 or access authorization rules based on such variables as time and location. Authorization is granted if the object's identity meets stored criteria or meets predetermined rules. If the system does not authorize access, the system creates an alarm 70.

Another embodiment of the present invention includes a system and method for information device-identity pair confirmation. With most security or tracking systems, it is assumed that a person using an information device 30 such as a security access card is the person in possession of the identity card. This may not be the case. Identity cards are sometimes lost, loaned to another for unauthorized use or stolen or recovered by unauthorized personnel. When this happens, someone without authorization may enter restricted areas without detection. The present invention provides a system and method of determining the identity of an individual by independent biometric measurements and comparing measured biometric data to stored biometric information specific for the individual. If measured biometric information is identical to stored biometric information, this confirms that the person 60 in possession of an information device 30 is the person 60 who should properly possess the information device 30. If the person 60 in possession of the information device 30 should not have the information device 30, the present invention is capable of triggering an alarm 70.

This system and method of information device-identity pair confirmation uses identity and biometric information obtained by scanning the person 60. One example of obtaining biometric information is to design an information device 30 that can detect and record fingerprint patterns. An interrogation device 40 retrieves both the biometric fingerprint information and identity information stored in the information device 30. Another example of obtaining biometric information is to scan individuals 60 with radio frequencies and detect reflected radio frequency patterns that identify the individual 60. These scanned radio frequency patterns can be compared to stored patterns known to identify the individual 60. Another example of this embodiment is to attach a physiologic sensor 90 (not shown) to an information device 30. One example of such a physiologic sensor 90 is one capable of detecting skin characteristics using optical means to uniquely identify an individual 60. The sensor information may be transferred to the information device 30 so that an interrogation device 40 can scan it. Other types of physiologic sensors 90 could detect ECG, EKG, blood pressure, pulse, galvanic skin response, skin color, oxygen tension, or blood glucose level. Many other types of physiologic sensors 90 may be employed within the scope of the present invention. Another example of this embodiment is an information device 30 that permits the person 60 wearing the information device 30 to manually enter a password. The interrogation device 40 can retrieve the entered password as well as identification information on the information device 30.

Physiologic and biometric characteristics of a person 60 may be determined by different sensors or by the same sensor, and may also be determined by scanning the person 60. For example, a camera is an example of sensor which can be used to take a picture to record a person's appearance such as skin color, and which can also be used to record a person's iris pattern. It should be noted that physiologic characteristics generally relate to characteristics that are not unique to one person 60, such as a breathing pattern, and that biometric characteristics relate to characteristics which are unique to a particular individual, such as a fingerprint.

In another embodiment, the physiologic sensor 90 is used to determine whether a person 60 is in danger within the defined area 10. In this embodiment, the physiologic sensor 90 is coupled to the information device 30. The sensor 90 detects a physiologic state with the physiologic sensor. Physiologic information related to the physiologic state is stored in the information device 30, and is transmitted to the interrogation device 40, and from there is transmitted to the master controller unit 50. The master controller unit 50 determines whether the physiologic information for a person 60 obtained from the physiologic sensor represents an abnormal condition, and creates and transmits an alarm 70 of unauthorized presence or access if an abnormal condition is found. The abnormal condition exists if the physiologic information is outside a range of normal values for the physiologic state.

Another embodiment of the present invention provides a system and method of detecting and alarming unauthorized removal or utilization of an information device 30 by an individual 60. In this embodiment, real time identity information 100 (not shown) associated with a person 60 must be obtained. This real time information 100 may include dental records, fingerprints, body weight, body dimensions, skin color, hair color, identifying marks, racial characteristics, blood type, DNA sequence, or other confidential information known only to the individual 60, such as mother's maiden name, social security number or place of birth. Real time identity information 100 for a person 60 may be obtained by automatic passive or active scanning of biometric data with or without the aid of an information device 30. Real time identity information 100 for inanimate objects 20 such as packages might include contents, labeling, chemical compositions, physical dimensions, physical properties, shipping date, attached work orders or descriptive information, or electronic identifiers. Real time identity information 100 for inanimate objects 20 may also be obtained by automatic passive or active scanning of additional electronic identifiers such as RFID tags with or without the aid of information device 30. By comparing real time identity information 100 with identity information stored on the information device 30, one can create an alarm 70 if real time identity information does not agree with stored identity. The alarm 70 indicates that an unauthorized person has possession of the information device 30.

In another embodiment, a system and method of detecting and alarming unauthorized removal or utilization of a information device 30 includes placing a plurality of information devices 30 on a single animate or inanimate object 20. To detect unauthorized removal or utilization, one compares real time identity information 100 stored on one information device 30 associated with a single animate or inanimate object 20 with the identify information stored on a second information device 30. If the identify information on the two information devices 30 does not agree, then the system creates an alarm 70 that can warn system users of unauthorized removal or utilization.

Another embodiment of the present invention provides a system and method for controlling an environment based on information contained within an information device 30 associated with an object 20. Information devices 30 may be attached to sensors to gather environmental information such as illumination level, temperature, pressure, humidity, gas composition, particle counts, presence of biological or chemical agents, or physiologic information. The interrogation device 40 collects this environmental information by interrogating the information device 30 as described previously. The master controller unit 50 evaluates the environmental status and transmit control signals via the interrogation device 40 to controllers to control the environment. In addition, the interrogation device 40 may scan an object 20 within a defined area 10 to determine identity, physiologic status or preprogrammed environmental preferences or requirements. This information may be stored on an information device 30 associated with the object 20 or in some other memory device in communication with the present invention. Based on environmental preferences of the object 20, the master controller unit 50 can change the environmental conditions in the defined area 10. For example, the master controller unit 50 may have stored therein rules that a defined area should be maintained at a particular temperature if an object 20 is present, but be otherwise maintained at another temperature. The interrogation device 40 determines if a person 60 or object 20 enters the defined area 10 and adjusts the temperature according to the object's presence in the defined area 10.

A package 110 might also have an information device 30, such as a RFID device, that controls warehouse storage conditions. An interrogation device 40 may determine package storage conditions when a package 110 enters a warehouse and creates an alarm 70 if environmental conditions exceed predetermined limits or adjust temperature and humidity to required limits.

Another embodiment of the present invention provides the ability to communicate with a person 60 through an information device 30. For example, if a person 60 enters an unauthorized defined area 10, the location of the person 60 can be determined by interrogating the information device 30 worn by the person 60. The interrogation device 40 interrogates the defined area 10 and communicates with the master controller unit 50. The master controller unit 50 determines that the person 60 is not authorized in the defined area 10. In one aspect of this embodiment, the master controller unit 50 directs the interrogation device 40 to transmit a signal to the information device 30 for notification of unauthorized access. The information device 30 may include an alarming device 80 such as a visual or auditory alarm 70 that will notify the person 60 or surrounding people that the person 60 should not be in the restricted defined area 10.

Yet another embodiment of the present invention involves monitoring and controlling a mixed identity environment, in which objects 20 with and without information devices 30 may be found. For example, a person 60 may carry an information device 30 for identification purposes, or a person 60 may be identified by biometric scanning, or simply by monitoring movement. A person 60 may be detected within a defined area 10 by a unique pattern of reflected radio waves and tracked by the movement of that unique pattern. By incorporating the dual capability of information device 30 tracking and biometric scanning, people 60 and objects 20 can be tracked within the defined area 10, whether they have an information device 30 or not, and an authorization of their presence within the defined area 10 can be determined.

The following examples illustrate this embodiment. One such example involves monitoring mixed identities for school security. Each student in a school has an information device 30 that permits entry, exit or passage between various points within the school perimeter. In another example, the present invention detects and monitors people without information devices 30 entering, leaving and moving within the school perimeter. People 60 without information devices 30 would not go undetected using the present invention.

Another example of the present invention involves controlling access to commercial buildings. Security systems used for commercial buildings monitor entry into buildings of personnel with information devices 30. However, someone without an information device 30 may enter a building undetected if accompanied by someone who does have an information device 30. The unauthorized person can only be detected if surveillance cameras or security guards are also employed. This, of course, is more costly and complex to implement.

Still another embodiment of the present invention includes a method of package 110 identification and tracking within defined areas 10. A package 110 or other inanimate object 20 includes an information device 30 that has information stored thereon that identifies the package 110 associated with the information device 30. The information device 30 may include additional information including but not limited to (i) preprogrammed authorization levels, (ii) content information, (iii) disposition information, (iv) storage and stability information, (v) safety information and (v) memory for receiving information dynamically from the interrogation device 40. Alternatively, packages may not have an information device 30. In this case it may be possible to determine the identity of the package using physical, chemical or biologic sensors 90. For example, volatile organic component sensors can detect the presence of many explosives.

Alternatively, one may be able to identify a package 110 by determining its position or change in position. If a package 110 or object 20 has a unique radio frequency signature (for example a gun or explosive), the object 20 may be detected directly. The present invention may also be used to detect an unattended package 110 by associating the package 110 with another object and determining of the package 110 and the associated object have been separated.

In another embodiment of the present invention, automatic warehousing of packages 110 within a defined area 10 includes package 110 identification and tracking. If a package 110 has an information device 30 attached thereto, an interrogation device 40 can determine the identity of the package 110, its spatial coordinates and its movement within a warehouse. The information device 30 may also include (i) preprogrammed authorization levels, (ii) content information, (iii) disposition information, (iv) storage and stability information, (v) safety information and (v) memory for receiving information dynamically from the interrogation device 40. Using the interrogation device 40, one can determine in real time when packages 110 enter or leave a warehouse and where they are located within the warehouse. A package 110 can be stored almost anywhere without fear of losing the package 110 since one can easily determine its coordinates within the warehouse using an appropriately positioned interrogation device 40.

Another embodiment of the present invention provides an automated filing system. Files with information devices 30 can be stored randomly and retrieved after the location is determined with an interrogation device 40. This approach reduces the chance of misplacing or losing important documents. It also reduces the time required to retrieve documents or files. Additional information stored in the information device 30 can help determine whether a file is relevant without retrieving and reviewing the complete file.

Another embodiment of the present invention relates to baggage handling for airline, bus or train or other means of travel. By attaching information devices 30 to bags and passengers, interrogating the defined area 10 (the airport perimeter or other location), and communicating with the a master controller unit 50, the present invention determines where a person's bags are after the person 60 enters the defined area 10 in relationship to the owner.

In yet another embodiment, the present invention also provides a method of information transfer from an information device 30 positioned on an object 20 within a defined area 10. The method includes transmitting data from the information device 30 to at least one interrogation device 40. Data is then transmitted from the at least one interrogation device 40 to a master controller unit 50. The data is compiled at the master controller unit 50 to determine characteristic information associated with the object 20. In this embodiment, the method may also include transmitting data from the information device 30 to at least one passive repeater 120, and relaying the data from the at least one passive repeater 120 to the at least one interrogation device 40. The method may also include relaying the data from the at least one information device 30 to the at least one interrogation device 40 through a plurality of passive repeaters 120. A transmission path for transmitting data is bi-directional, such that data flows from the at least one information device to the interrogation device to the master controller along the transmission path, and such that data flows from the master controller unit to the at least one interrogation device to the at least one information device along the transmission path. It is noted that in all embodiments of this invention, the path of transmission of information, including signals and data may include bi-directional or multi-directional paths.

An information device 30 as contemplated by the present invention may be any device that is capable of active or passive communications and stores information regarding the object 20 on which it is placed. As discussed above, an example of an information device 30 according to the present invention is a standard RFID tag, drawings of which are shown in FIG. 4 and FIG. 5. Standard RFID tags include a front-end that converts radio frequency or inductively coupled energy to the DC power required to operate the tag, and demodulates or detects the information signal. The RFID tags also include circuitry, often comprising a single chip, which contains the identification information and the capability to perform additional functions when the RFID tag is powered.

RFID tags have different frequencies and come in many different shapes and with different functions. Unlike inductive RFID tags which require substantial surface area, many turns of wire, or magnetic core material to collect the magnetic field, UHF and microwave tags can be very small requiring length in only one dimension. Thus, in addition to longer range over the inductive systems, the UHF and microwave tags are easier to package and come in a wider variety of configurations. Tag lengths of 2 to 10 cm are typical. The tag's thickness is limited only by the thickness of the chip as the antenna can be fabricated on thin flexible materials. Since tags operating in the E field do not require antennas with extremely low impedances, inexpensive flexible antennas able to withstand considerable bending are achievable.

RFID systems operate in both low (less than 100 MHz) and high frequency (greater than 100 MHz) modes. Unlike their low-frequency counterparts, high-frequency tags can have their data read at distances of greater than one meter, even while closely spaced together. New data can also be transmitted to the tags.

FIG. 4 is a view of a low frequency information device 30, such as an RFID tag. Information devices 30 such as those shown in FIG. 4 and FIG. 5 include a reader portion 130 and a tag portion 140. In low-frequency systems such as those shown in FIG. 4, an integrated circuit 150 in the reader portion 130 sends a signal to an oscillator 160, which creates an alternating current in the reader portion's coil 170. That current, in turn, generates an alternating magnetic field that serves as a power source for the tag portion 140. The field interacts with the tag portion's coil 180 in the tag, which induces a current that causes charge to flow into a capacitor, where it is trapped by the diode. As charge accumulates in the capacitor, the voltage across it also increases and activates the tag portion's integrated circuit 190, which then transmits its identifier code. High and low levels of a digital signal, corresponding to the ones and zeros encoding the identifier number, turn a transistor on and off. Variations in the resistance of the integrated circuit 190, a result of the transistor turning on and off, cause the tag portion 140 to generate its own varying magnetic field, which interacts with the reader portion's magnetic field. In this technique, called lead modulation, magnetic fluctuations cause changes in current flow from the reader portion 130 to its coil 170 in the same pattern as the ones and zeros transmitted by the tag portion 140. The variations in current flow in the reader portion's coil 170 are sensed by a device that converts this pattern to a digital signal. The reader portion's integrated circuit 150 then discerns the tag's identifier code.

FIG. 5 is a view of a high frequency information device 30, such as an RFID tag. In a high-frequency system, the reader portion's integrated circuit 150 sends a digital signal to a transceiver 200, which generates a radio-frequency signal that is transmitted by a dipole antenna 210 in the reader portion 130. The electric field of the propagating signal gives rise to a potential difference across a dipole antenna 220 in the tag portion 140, which causes current to flow into the capacitor, the resulting charge is trapped there by the diode. The voltage across the capacitor turns on the tag portion's integrated circuit 190, which sends out its unique identifier code as a series of digital high and low voltage levels, corresponding to ones and zeros. The transistor gets turned on or off by the highs and lows of the digital signal, alternately causing the dipole antenna 220 to reflect back or absorb some of the incident radio-frequency energy from the reader portion 130. The variation in the amplitude of the reflected signal, in what is called backscatter modulation, correspond to the pattern of the transistor turning on and off. The reader portion's transceiver 200 detects the reflected signals and converts them to a digital signal that is relayed to the reader portion's integrated circuit 150, where the tag portion's unique identifier is determined.

Typical memory size for information devices 30 such as RFID tags ranges from 64 bits for simple device to several Kbytes for devices used in data rich logistic applications. Memory types include factory-programmed "read only" for identification purposes with small memory size requirements, one time field programmable devices (OTP), and read/write tags which permit data to be changed.

Passive information devices 30 store information in memory therein but do not have a source of power other than that provided by a signal from an external source, such as an interrogation device 40. One type of information device 30 capable of use with the present invention is a preprogrammed information device 30. This type of information device 30 may not be programmed by an interrogation device 40. Still another type of information device 30 may be powered by interrogation device 40 at which time it performs specified functions in addition to reporting stored information.

An active information device 30 is powered from a source other than the interrogation device 40. For example, if the information device 30 is to be mobile it may have battery-supplied power. A cell phone and keyless entry system in a car and the hand-held controller for such a keyless entry system are examples of active information devices 30.

One example of an active information device 30 is one which is capable of identifying the object 20 on which it resides. For animate objects 20, identification of the object 20 may include active biometric signature determination, which requires the identity to participate directly in the biometric determination by positioning itself or part of itself with respect to the sensor, such as fingerprint, iris pattern or hand or other blood vessel pattern. Identification may also include passive biometric identification, which does not require active participation of the identity in order to measure or sense the identity's biometric property. Identification may further include proximity to another information device 30 to confirm the identity. For example two information devices 30 can be positioned on an object 20, where one is obvious and the other is hidden, that must have a prescribed relationship with respect to each other. Identification may also performed by an information device 30 that must be re-authenticated each time it is moved. An example of this is an information device 30 worn on the wrist for which a password must be entered each time the wristband is opened and closed.

Information devices 30 capable of identifying the object 20 on which it resides by actively taking biometric or physiologic information may include additional modules for capturing specific biometric information. For example, a fingerprint module is a sensor which may be coupled to an information device 30 for use with the present invention. Other examples include image sensors that may be used to capture the image of the eye for a retinal scan or detection of an iris pattern. Another example is a sensor capable of detecting vascular patterns, such as the vein pattern on the back of a hand, or skin surface proximate capillary patterns. An information device 30 or sensor worn on the wrist may measure other characteristics such as wrist size, skin temperature and skin resistance.

In one embodiment, an information device 30 identifying the object 20 on which it resides may also signal that it has been moved from the object 20 on which it belongs. In one aspect of this embodiment, the information device 30 sends a signal when it can no longer confirm the identity of the object 20 on which it is or was placed. Another aspect of this embodiment includes an information device 30 comprised of two parts that must both be moved/removed according to a specific protocol to avoid a signal that the information device 30 has been improperly removed. Such a two-part information device 30 may confirm identity by being positioned within a specific distance from each other, such that at some time prior to interrogation, this proximity is valid only for a given time period. For example, a user must set/reset encryption key periodically by bringing one part of the device to a "recharge station."

Another example of an information device 30 contemplated by the present invention is one which must be re-authenticated each time it is moved from an object 20. Such an information device 30 may be one that is worn on the wrist and for which a password must be entered each time the wristband is opened and closed.

Yet another example of an information device 30 according to this embodiment of the present invention is one which opening a wristband cuts an electrical connection for proper operation of the information device 30. This connection is completed when a tool is used to affix the wristband. Such an information device 30 may be embodied, for example, on a single use identification bracelet.

The present invention determines the presence of objects 20 and communicates with information devices 30 by spatially and temporally surveying the defined area 10. Interrogation devices 40 contemplated by the present invention perform this spatial and temporal survey of the defined area 10. In the present invention, therefore, at least one interrogation device 40 is within a transmission and detection range of a defined area 10. One example of an interrogation device 40 contemplated by this invention is one that typically relies on low cost implementation technology, operating in the microwave range to enable radar-like operation for identifying and tracking objects 20 with or without information devices 30. One or more interrogation devices 40 each with scanning capability are used to localize the position and interrogate each information device 30 within its range. Information from all interrogation devices 40 are combined to locate and identify objects 20 within a defined area 10.

Several different types of interrogation devices 40 are contemplated for use with the present invention. In one embodiment, an interrogation device 40 locates objects 20 within a defined area 10 without information devices 30 positioned thereon. An interrogation device 40 according to this embodiment emits a signal and analyzes the return signal to determine the presence of objects 20 within its scan range. The interrogation device 40 may operate at different frequencies and at different distances depending on a variety of factors, including the aperture and antenna configuration and the type of application for which transmission is being used. In one embodiment, the interrogation devices 40 may transmit 10 to 30 GHz signals focused in a narrow aperture using a phased array antenna for distances up to 100 meters. In another embodiment, the interrogation device 40 operates with a spatial resolution of less than a meter at distances up to 100 meters; in the embodiment where the frequency is 10 GHz, the wavelength is 3 cm. In another embodiment, the interrogation device 40 performs a mapping function using electromagnetic radiation in any band providing desired resolution, such as RF with a frequency of 984 MHz for distances of 1 foot, RF with a frequency between 30 and 15 GHz for distances of 1 or 2 cm. This technology is well known and is widely used for applications such as radar systems.

Other interrogation devices 40 according to this embodiment operate over a large range at relatively low power, such as a wireless device. Such interrogation devices 40 may have a range of several miles or larger. These long-range interrogation devices 40 employ a narrow directed beam from the interrogation device 40. Use of the narrow beam delivers more power and more signal strength to the information device 30. Use of this technology also allows greater sensitivity in receiving a response from the information device 30.

In another embodiment of the present invention, a plurality of interrogation devices 40 are employed, each of which is capable of communicating with other at least one other interrogation device 40. Such interrogation devices 40 are configured to operate in a relay format, in which one or more interrogation devices 40 interrogate a defined area 10, and communicate received data to and from another interrogation device 40 in the plurality of interrogation devices 40 as part of the overall system of communication with a master controller unit 50. This type of communication technology is widely known in the art and is commonly used in systems such as mobile telephone networks, in which devices communicate with one another either directly or through a base station.

Another embodiment of an interrogation device 40 capable of operating in synchrony with other such interrogation devices 40 is one which creates a “large aperture” device for fine resolution. Examples of such devices include synthetic aperture radar. A spatial array of interrogation devices 40 operating in appropriate synchrony can duplicate a moving antenna configuration, such as in radio telescopes and phased array devices.

An interrogation device 40 according to the present invention communicates data to and from a master controller unit 50, which is located within a transmission and detection range of at least one interrogation device 40. A master controller unit 50 according to the present invention may be a single device or a distributed group of devices. A master controller unit 50 may include a computer or a computer network that receives information from one or more interrogation devices 40. Examples of a master controller unit 50 include cell phone networks, in which a base station acts as the master controller unit 50, and the Internet, in which with various servers acts as network of distributed master controller units 50.

One function of a master controller unit 50 of the present invention is compiling information received from an interrogation device 40. The master controller unit 50 compiles such information to perform a variety of other functions, such as resolving the location of an object 20 within the defined area 10, determining its identity, and defining access and presence conditions. The master controller unit 50 may accomplish this by performing algorithmic functions to determine the position of the object 20. One example of an algorithm applied by a master controller unit 50 is one for which the intersection of every possible pair of interrogator direction lines is determined. The centroid of the points is computed as the estimate of the object’s location.

Information processed by a master controller unit 50 may also be transmitted to another master controller unit 50, or displayed for human review. The location of objects can be displayed graphically for a human observer to review and act upon. The master controller unit 50 may also control an environment within the defined area 10 in accordance with information received from the interrogation device 40. Environmental control may include limiting ingress to the defined area 10 if the capacity of the defined area 10 has been reached or if other conditions such as a dangerous object or classified material are present. Environmental control may also include adapting an environment to a specific object 20 or a group of objects 20. For example, if inanimate objects 20 requiring specific temperature or humidity control are found, the appropriate conditions can be imposed. If certain human identities are sensed that are for example visually impaired, then audible environmental warnings stating the dangers explicitly can be announced as opposed to say the normal light indicators.

It is to be understood that other embodiments may be utilized and structural and functional changes may be made without departing from the scope of the present invention. The foregoing descriptions of embodiments of the invention have been presented for the purposes of illustration and description. It is not intended to be exhaustive or to limit the invention to the precise forms disclosed. Accordingly, many modifications and variations are possible in light of the above teachings. For example, multiple information devices 30, and many different types of passive and active information devices 30 in different combinations may be used in accordance with the present invention. Additionally, the information device 30 may be of any size, including nano-scale devices, and may be embedded in another device or some other vehicle on the object 20, including human skin or blood. An object 20 may therefore have any number of nano-scale information devices positioned thereon, each capable of indicating characteristic information associated with the object 20, and each capable of communicating with another such device and/or with an interrogation device 40. It is therefore intended that the scope of the invention be limited not by this detailed description.

The invention claimed is:

1. An apparatus for tracking a patient specimen, comprising:

a plurality of information devices including:

a first information device associated with a patient and having stored thereon patient information;

a second information device associated with an order for a patient’s specimen collection and having stored thereon specimen collection information;

a third information device associated with at least one specimen collection vessel;

at least one interrogation device capable of communication with the plurality of information devices, the at least one interrogation device reading the patient information from the first information device and the specimen collection information from the second information device, writing the patient information and the specimen collection information to the third information device associated with an at least one specimen collection vessel, and transmitting the patient information and the specimen collection information from the third information device stored on the at least one specimen collection vessel to a fourth information device associated with at least one specimen analysis device, so that each at least one specimen analysis device is associated with the patient and the order for the patient’s specimen collection.

2. The apparatus of claim 1, wherein additional information is written to the third information device, the additional information including at least one of a time of transfer of patient information and specimen collection information to the specimen collection vessel, a location from which a patient’s specimen is transferred, a location of the specimen collection vessel, information describing a handling party, and descriptive information of circumstances of transfer to the specimen collection vessel.

3. The apparatus of claim 2, wherein the additional information written to the fourth information device includes information describing the specimen analysis device, the information describing the specimen analysis device comprising a time of transfer of information to the specimen analysis device, a location of the specimen analysis device, descriptive information of circumstances of transfer to the specimen analysis device, and a location of the specimen analysis device.

4. The apparatus of claim 3, further comprising tracking the patient information, the specimen collection information, the additional information, and information describing the specimen analysis device as a patient’s specimen, a specimen collection vessel, and a specimen analysis device are moved between a plurality of different locations.

5. The apparatus of claim 4, further comprising a sensor coupled to the at least one specimen analysis device, wherein a result produced by the at least one specimen analysis device is sensed by the sensor and written to the fourth information device.

6. The apparatus of claim 4, further comprising a master controller unit having a memory, the patient information, the specimen collection information, the additional information, and the information describing the specimen analysis device being transmitted to the master controller unit by the interrogation device for storing in the memory and tracking the patient information, the specimen collection information, the additional information, and the information describing the specimen analysis device.

7. The apparatus of claim 5, further comprising a master controller unit having a memory, the patient information, the specimen collection information, the additional information, the information describing the specimen analysis device, and the result produced by the at least one specimen analysis device being transmitted to the master controller unit by the interrogation device for storing in the memory and tracking the patient information, the specimen collection information, the additional information, the information describing the specimen analysis device, and the result.

8. The apparatus of claim 1, wherein the plurality of information devices are radio frequency identification tags.

9. The apparatus of claim 1 or 2, wherein the specimen collection information indicates the type of patient specimen to be taken.

10. The apparatus of claim 9, wherein the patient specimen includes biological matter of the patient.

11. A calibration apparatus, comprising:

a sensor for sensing the presence of an information device associated with a first reagent in a plurality of reagents when the first reagent is placed within an instrument for analysis;

an interrogation device for interrogating the first information device to read calibration information related to response characteristics of the first reagent stored on the first information device and for transmitting the calibration information to the instrument to substantially increase accuracy in determining a response of the first reagent in a chemical reaction; and a master controller unit for storing and tracking the calibration information associated with each reagent in the plurality of reagents.

12. The apparatus of claim 11, wherein each reagent in the plurality of reagents is associated with an information device having calibration information stored thereon, the calibration information of each reagent in the plurality of reagents being transmitted to an instrument to substantially increase accuracy in determining a response of each reagent in the plurality of reagents in a chemical reaction.

13. The apparatus of claim 12, wherein the master controller unit tracks the plurality of reagents as they move between a plurality of different locations.

14. The apparatus of claim 13, wherein each information device is a radio frequency identification tag.

15. The apparatus of claim 14, wherein each reagent in the plurality of reagents includes a sensor coupled to the reagent.

* * * * *